United States Patent [19]

Fuehrer

[11] Patent Number: 4,502,279
[45] Date of Patent: Mar. 5, 1985

[54] TORQUE CONVERTER ATTACHMENT AND METHOD

[75] Inventor: Reece R. Fuehrer, Danville, Ind.

[73] Assignee: General Motors Corporation, Detroit, Mich.

[21] Appl. No.: 492,604

[22] Filed: May 9, 1983

[51] Int. Cl.$^3$ .............................................. F16D 33/00
[52] U.S. Cl. ..................................... 60/330; 29/469; 29/450; 403/315; 403/359
[58] Field of Search .................... 29/469, 450; 60/330; 74/688, 730, 573 F; 403/315, 359

[56] References Cited

U.S. PATENT DOCUMENTS

| 2,596,700 | 5/1952 | Lapsley | 74/731 |
| 3,389,923 | 6/1968 | Love, Jr. et al. | 29/450 |
| 4,257,229 | 3/1981 | Labuda | 60/330 |

Primary Examiner—Robert E. Garrett
Assistant Examiner—John M. Husar
Attorney, Agent, or Firm—Saul Schwartz

[57] ABSTRACT

An attachment for automatically connecting a torque converter impeller housing to an engine output member including splines on the output member, splines on the impeller housing, a plurality of ramp surfaces on impeller housing, and a corresponding plurality of resilient tangs on the engine output member. When the torque converter impeller housing is supported on the transmission and shifted as a unit with the latter toward the engine the splines automatically engage to connect the impeller housing and the engine output member for unitary rotation while the ramp surfaces first cam the tangs to positions permitting unrestricted movement of the impeller housing to an assembled position and are thereafter automatically engaged by the tangs to prevent withdrawal from the assembled position.

3 Claims, 3 Drawing Figures

TORQUE CONVERTER ATTACHMENT AND METHOD

BACKGROUND OF THE INVENTION

1. Field of the Invention

This invention relates generally to engine-torque converter attachments and, more particularly, to an improvement in such attachments whereby the torque converter is more readily joined to the engine at final assembly.

2. Description of the Prior Art

In assembly line operations, particularly automotive assembly line operations, it is desirable to simplify individual assembly procedures so as not to impede line speed. For example, where conventional automatic transmissions and engines are joined, it is necessary to provide for connection of a torque converter impeller housing to the flywheel or flex plate of the engine. Because the torque converter impeller housing is usually fully shrouded by the transmission case in the assembled position of the latter, manufacturers have typically resorted to installation of bolt type fasteners on a one-by-one basis through access openings provided for that purpose. This procedure is necessarily time consuming and prone to delay. A torque converter attachment and method according to this invention avoids the need for separate fastener installation and thereby simplifies the entire assembly procedure.

SUMMARY OF THE INVENTION

Accordingly, the primary feature of this invention is that it provides a new and improved torque converter attachment and method whereby final attachment of the torque converter impeller housing to the engine does not require separate fastener installation. Another feature of this invention resides in the provision in the new and improved torque converter attachment of automatic connecting means on the engine output member and on the torque converter impeller housing which do not impede joinder of the two components during assembly but which automatically prevent subsequent withdrawal. Still another feature of this invention resides in the provision of connecting means including a plurality of ramps on the torque converter impeller housing and resilient tangs on the engine output member which permit passage of the ramps to positions corresponding to the assembled position of the torque converter impeller housing and thereafter automatically engage the ramps to prevent withdrawal of the impeller housing. A still further feature of this invention resides in the provision in the improved torque converter attachment of splines on the engine output member and on the torque converter impeller housing which engage as the torque converter impeller housing achieves its assembled position to couple the engine output member and the torque converter impeller housing while the resilient tangs automatically prevent disengagement of the splines. These and other features of this invention will be readily apparent from the following specification and from the drawings wherein:

Figure 1:
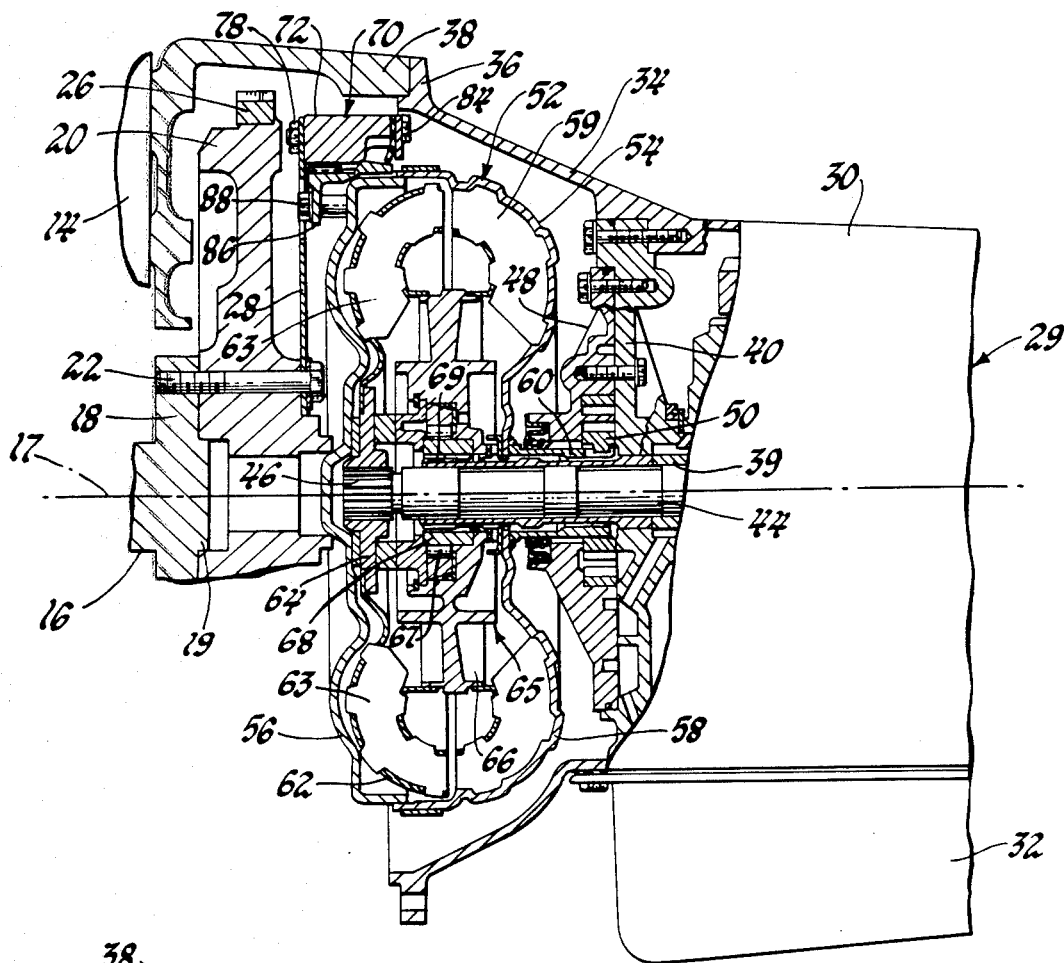
FIG. 1 is a partially broken away side elevational view of a vehicle drive line including an engine, a torque converter, and a transmission including a torque converter attachment according to this invention.

Referring now to FIG. 1 of the drawings, the drive line of an automotive vehicle includes an engine having a fragmentarily illustrated engine block 14 which supports a crankshaft 16 for rotation about a longitudinal axis 17 defined by the block. The crankshaft has an end flange 18 and a smaller diameter pilot portion 19 on which is supported a flywheel 20. The flywheel is rigidly connected to the end flange 18 by a bolt 22 illustrative of a plurality of such bolts arrayed around the flange. A ring gear 26 attached to the flywheel is engaged by a starter mechanism, not shown, for cranking the engine during starting. The attachment bolts represented by bolt 22 also function to connect a circular flex plate 28 to the flywheel for unitary rotation with the latter about axis 17, the flex plate being the output member of the engine.

With continued reference to FIG. 1, the drive line further includes an automatic transmission 29 exemplified by the AT540 series automatic transmissions manufactured by the Detroit Diesel Allison Division of General Motors Corporation. Generally, the transmission 29 includes a main case portion 30 having a sump cover 32 bolted thereto and an integral, generally bell shaped forward extension 34. In an assembled position of the transmission relative to the engine, FIG. 1, a flange 36 around the extension 34 abuts a corresponding surface on a bell housing 38 which is rigidly attached to the engine block 14 by conventional means, not shown, and generally completely surrounds the flywheel 20 and the flex plate 28.

A hollow stator shaft 39 is rigidly supported on an internal front cover 40 of the transmission and is aligned on a main axis of the transmission which coincides with axis 17 in the assembled position of the transmission. A transmission input shaft 44 is rotatably supported by the transmission within the stator shaft 39 and has a splined end 46 projecting beyond the forwardmost end of the stator shaft. An oil pump assembly 48 is bolted on the front of the front cover 40 and has mounted therewithin a pump gear 50 which surrounds the stator shaft 39.

The drive line similarly further includes a torque converter 52 disposed between the flex plate 28 and front cover 40 within case extension 34. The torque converter includes an impeller housing 54 made up of a generally circular front panel 56 welded to an annular rear panel 58. The impeller housing supports internally a plurality of impeller blades 59 and, externally, a sleeve 60 which projects rearwardly into driving engagement with the pump gear 50 of the oil pump 48. The impeller housing 54 and the sleeve 60 form a generally closed chamber within which is disposed a turbine 62 having a plurality of turbine blades 63 and a splined hub 64 drivingly engaging the splined end 46 of the shaft 44. A stator assembly 65 within the housing 54 includes a plurality of stator blades 66, an overrunning clutch 67, and a hub 68 having a spline connection to the stator shaft 39 at 69.

As seen best in FIGS. 1 and 2, the torque converter impeller housing 54 is connected to the flex plate 28 by an attachment according to this invention which includes a plurality of identical segments arranged symmetrically around the axis 17 when the torque converter is installed between the transmission and the engine, only a single segment 70 being illustrated in the drawing FIGS. and described hereinafter. The segment 70 includes a driving member 72 having a plurality of internal splines 74, FIG. 3, disposed on an arc about the axis 17. The driving member 72 is attached to the flex plate 28 by a bolt 76 passing through the driving member and a nut 78 on the forward side of the flex plate. A resilient tang 80 is captured between the rearward end of the driving member 72 and a plate 82 attached to the driving member by a bolt 84. In an unstressed, extended position, not shown, the tang 80 orients itself in plane perpendicular to the axis 17.

Figure 2:
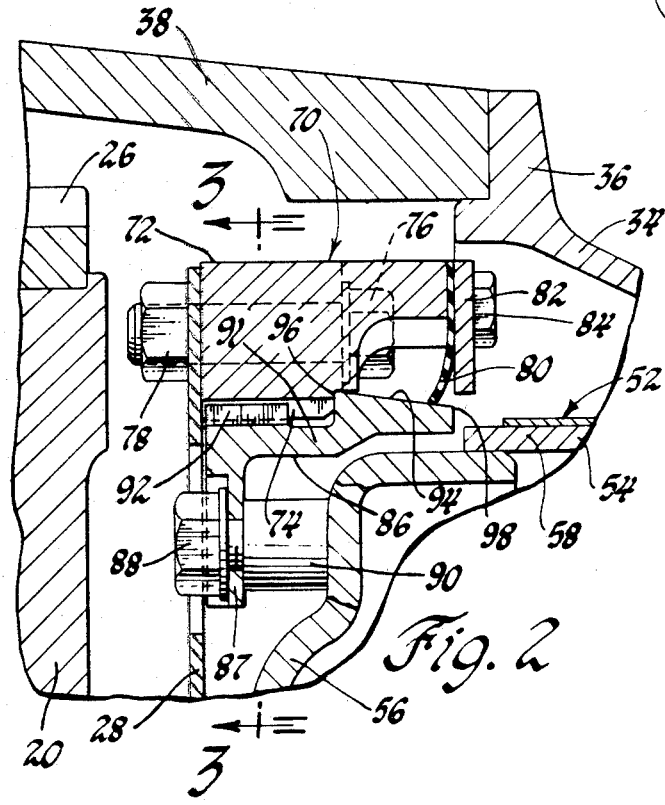
FIG. 2 is an enlarged view of a portion of FIG. 1 showing the torque converter attachment according to this invention.
Figure 3:
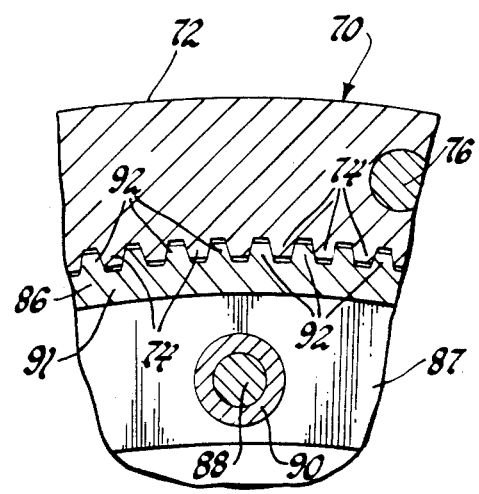
FIG. 3 is an enlarged sectional view taken generally along the plane indicated by lines 3—3 in FIG. 2.

As seen best in FIG. 2, the segment 70 further includes a driven member 86 having a transverse flange 87 rigidly attached to the impeller housing 54 by a bolt 88 received in a boss 90 on the impeller housing and in appropriate clearance holes in the flex plate 28. An axial flange 91 of the driven member 86 has a plurality of external splines 92 disposed on an arc about axis 17 and engaging the splines 74 on the driving member 72 to connect the flex plate 28 and the impeller housing 54 for unitary rotation. Rearwardly of the splines 92, the driven member 86 has a ramp surface 94 formed thereon, the ramp surface representing a segment of the surface of a truncated cone disposed symmetrically about axis 17. The ramp surface 94 is bounded at its forwardmost end by a leading edge 96 and at its rearwardmost end by a trailing edge 98. The radial distance from the axis 17 to the leading edge 96 exceeds the corresponding radial distance from the axis 17 to the trailing edge 98 so that the ramp surface 94 slopes radially inward from front to back. In addition, the radial distances from the axis 17 to each of the leading edge 96 and the trailing edge 98 exceeds the radial distance from the axis 17 to the innermost end of the resilient tang 80 in the extended position of the latter.

A typical assembly sequence commences with the engine, the transmission 29, and the torque converter 52 being subassembled at locations remote from the final assembly line. At some point prior to final assembly, the torque converter is normally mounted on the transmission by first positioning the open end of sleeve 60 over the exposed ends of shaft 44 and stator shaft 39 and sliding the torque converter toward front cover 40. As the torque converter is slid back, the free end of sleeve 60 engages pump gear 50 while generally simultaneously the splined hub 64 of the turbine engages the splined end 46 of the shaft 44 and the splined hub 68 of the stator assembly engages the splined free end of the stator shaft at 69. The torque converter is thus disposed in the transmission generally completely within the bell shaped extension 34 of the transmission case. However, because no part of the torque converter is axially positively connected to the transmission, the former may still experience some limited bodily displacement along the main axis of the transmission.

Continuing, at the final assembly line where the engine and transmission are to be joined and where efficiency is most important, the transmission 29, with torque converter 52 supported thereon, is aligned with the engine on axis 17 but separated from the bell housing 38 and flex plate 28. With the impeller housing 54 indexed to align driving and driven members 72 and 86, the transmission case 30 is shifted toward the engine during which movement the splines 92 on driven member 86 pass radially inboard of tang 80 and automatically engage splines 74 on the driving member 72. Generally simultaneously, the radially innermost extremity of tang 80 is engaged by leading edge 96 on the driven member and flexed leftwardly, FIGS. 1 and 2, from the extended position to a retracted position, not shown, allowing continued movement of the transmission 29 and torque converter 52 toward the engine.

As the leading edge 96 passes radially inboard or beneath tang 80, the resiliency of the latter biases its innermost edge onto the ramp surface 94 in continuous fashion. The transmission 29 achieves its fully assembled position when flange 36 contacts bell housing 38 whereupon the splines 74 and 92 are generally fully engaged to permit transfer of full rated torque between the flex plate 28 and the impeller housing 54. The tang 80, continuously biased against ramp surface 94, prevents any withdrawal of the torque converter impeller housing relative to the flex plate so that with respect to such withdrawal, a positive connection is established. With respect to continued displacement of the torque converter impeller housing toward the engine, manufacturing tolerances could permit the impeller housing 54 to creep toward the flex plate until the forwardmost extremity of front panel 56 contacts the rearwardmost extremity of the flywheel 20 whereupon a position of maximum engagement is achieved. During such creep the tang 80 permits leftward movement of the impeller housing but positively resists withdrawal from the position of maximum engagement. Accordingly, the impeller housing 54 is automatically and positively connected to the flex plate 28 without installation of separate fasteners during assembly. The assembly sequence is completed by the installation of external, easily applied fasteners, not shown, through the flange 36 to connect the transmission case 30 to the bell housing 38 and the engine.

To disassemble the transmission it is necessary to separate the impeller housing 54 from the flex plate 28. Alternative provisions for effecting such separation include unbolting the driving member 72 from the flex plate 28 or the driven member 86 from the impeller housing 54. This can be accomplished through appropriate access openings in the bell housing 38 and in the flywheel 20 or in the case extensions 34. In addition, access openings may be provided in the case extension 34 permitting removal or neutralization of the tangs 80. While each of these procedures requires special attention to the driving and driven members 72 and 86, a problem is not presented because repair operations normally are carried out on individual units rather than in assembly line fashion so that the time required for or complexity of any specific operation is not especially critical .

The embodiments of the invention in which an exclusive property or privilege is claimed are defined as follows:

1. In combination with an engine having a block and an output member rotatable about a longitudinal axis of said block, a transmission having a case defining a main axis, and a torque converter supported on said case with an impeller housing thereof rotatable about said main axis, said torque converter impeller housing being shiftable as a unit with said transmission case toward said block to an assembled position relative to said output member corresponding to an assembled position of said transmission case relative to said block wherein said longitudinal and said main axes coincide, an attachment between said impeller housing and said output member comprising, means on said output member defining a plurality of internal splines, means on said impeller housing defining a plurality of external splines automatically engageable with said internal splines in said assembled position of said impeller housing and operable to join said output member and said impeller housing for unitary rotation, means on one of said output member and said impeller housing defining a ramp surface bounded by an elevated leading edge and a relatively depressed trailing edge, a tang on the other of said output member and said impeller housing engageable on said ramp surface in said assembled position of said impeller housing and operable to prevent separation of said impeller housing from said assembled position relative to said output member, said elevated leading edge contacting said tang during movement of said impeller housing to said assembled position thereof and operable to cam said tang over said leading edge thereby permitting unrestricted movement of said impeller housing to said assembled position, and spring means on said other of said output member and said impeller housing biasing said tang toward said ramp surface so that said impeller housing is automatically prevented from separating from said output member after said impeller housing achieves said assembled position.

2. In combination with an engine having a block and an output member rotatable about a longitudinal axis of said block, a transmission having a case defining a main axis, and a torque converter supported on said case with an impeller housing thereof rotatable about said main axis, said torque converter impeller housing being shiftable as a unit with said transmission case toward said block to an assembled position relative to said output member corresponding to an assembled position of said transmission case relative to said block wherein said longitudinal and said main axes coincide, an attachment between said impeller housing and said output member comprising, a plurality of driving members each having a plurality of internal splines, means symmetrically and rigidly supporting said driving members on said output member with said internal splines disposed on arc segments of a common circle about said longitudinal axis, a corresponding plurality of driven members each having a plurality of external splines, means symmetrically and rigidly supporting said driven members on said impeller housing with said external splines disposed on arc segments of a common circle about said main axis, said external splines automatically engaging corresponding ones of said internal splines in said assembled position of said impeller housing to join said output member and said impeller housing for unitary rotation, means on each of said driven members defining a ramp surface bounded by an elevated leading edge adjacent said external splines and a relatively depressed trailing edge, and means on each of said driving members defining a resilient tang projecting radially inwardly and biased into engagement on said ramp surface in said assembled position of said impeller housing to prevent separation of said impeller housing from said assembled position relative to said output member, each of said leading edges being engageable on corresponding ones of said tangs during movement of said impeller housing to said assembled position and operable to cam said tangs over said leading edges thereby permitting unrestricted passage of said ramp surfaces so that subsequent engagement of said tangs on said ramp surfaces is automatic.

3. A method of automatically attaching an impeller housing of a torque converter supported on a transmission to an engine output member rotatable about a longitudinal axis of said engine comprising the steps of, forming splines on said output member, forming corresponding splines on said impeller housing engageable with said output member splines to connect the latter to the former for unitary rotation in an assembled position of said impeller housing relative to said output member corresponding to an assembled position of said transmission relative to said engine, forming a ramp surface on said impeller housing having an elevated leading edge and relatively depressed trailing edge, forming a tang on said output member engageable on said ramp surface in said assembled position of said impeller housing to prevent separation thereof from said output member, biasing said tang toward said ramp surface, and then aligning said impeller housing on said longitudinal axis and bodily shifting said transmission and said impeller housing as a unit to said assembled position of said transmission whereby said output member splines and said impeller housing splines automatically engage to connect said output member and said impeller housing for unitary rotation and said ramp surface leading edge engages said tang and cams the latter to a position permitting unrestricted movement of said impeller housing to said assembled position thereof whereafter said tang is biased against said ramp surface thereby to automatically prevent subsequent withdrawal of said impeller housing from said assembled position thereof.

* * * * *